(12) United States Patent
Hinderling

(10) Patent No.: US 7,268,880 B2
(45) Date of Patent: Sep. 11, 2007

(54) METHOD AND DEVICE FOR DETERMINING THE DISPERSIVE EFFECT ON A MEASUREMENT

(75) Inventor: Jürg Hinderling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 586 days.

(21) Appl. No.: 10/471,556

(22) PCT Filed: Mar. 9, 2002

(86) PCT No.: PCT/EP02/02636

§ 371 (c)(1),
(2), (4) Date: Sep. 12, 2003

(87) PCT Pub. No.: WO02/073130

PCT Pub. Date: Sep. 19, 2002

(65) Prior Publication Data

US 2004/0090627 A1    May 13, 2004

(30) Foreign Application Priority Data

Mar. 13, 2001 (EP) .................................. 01105432

(51) Int. Cl.
*G01N 21/00*    (2006.01)
*G01C 3/08*    (2006.01)

(52) U.S. Cl. ...................... 356/436; 356/437; 356/4.01; 356/5.01

(58) Field of Classification Search ............... 356/4.01, 356/5.01, 5.09–5.15, 28.5, 432–440
See application file for complete search history.

(56) References Cited

U.S. PATENT DOCUMENTS 5,233,176 A      8/1993   Veligdan .................. 250/206.2
6,646,724 B2 *  11/2003   Benz et al. ................. 356/5.01

OTHER PUBLICATIONS

Hirokazu Matsumoto et al., Measurement of the Changes in Air Refractive Index and Distance by means of a Two-Color Interferometer, Applied Optics, Optical Society of America, vol. 31, No. 22, Aug. 1, 1992, pp. 4522-4526, ISBN: 0003-6935.
Galkin Y. S. et al., Influence of Resonances on the Phase and the Group Refractive Indices of Air, Journal of Geodesy, Springer-Verlag, vol. 71, No. 11, Oct. 1997, pp. 680-684, ISBN: 0949-7714.

* cited by examiner

*Primary Examiner*—Gregory J Toatley, Jr.
*Assistant Examiner*—Amanda H Merlino
(74) *Attorney, Agent, or Firm*—McGrath, Geissler, Olds & Richardson, PLLC

(57) ABSTRACT

Provided are methods and devices for measuring the dispersion along a line of sight, using spectral narrow-band light sources with multiple wavelengths, and atmospheric structures, both in the absorptive (imaginary refractive index) and in the dispersive region (real refractive index).

25 Claims, 3 Drawing Sheets

METHOD AND DEVICE FOR DETERMINING THE DISPERSIVE EFFECT ON A MEASUREMENT

This application is the national phase under 35 U.S.C. § 371 of PCT International Application No. PCT/EP02/02636, which has an International filing date of 9 Mar. 2002, which designated the United States of America and which claims priority on European Union Patent Application number EP 011 054 32.7 filed 13 Mar. 2001, the entire contents of which are hereby incorporated herein by reference.

FIELD OF THE INVENTION

The invention relates generally to a method, apparatus, and system for determining line of sight dispersion effects on electromagnetic radiation. More particularly the present invention relates to correcting distance measurements for dispersion effects.

BACKGROUND OF THE INVENTION

In electro-optical distance measurement, in the distance range between 100 m and several km, the measurement is decisively influenced by the refractive index of air. The propagation velocity of an optical pulse emitted in the electro-optical distance measurement or of a signal path modulated in any desired manner is determined by the group refractive index n. This applies both to electro-optical distance-measuring instruments which are based on the phase principle and to those based on the transit time measurement principle.

Refractive index and group refractive index are not constant quantities but depend predominantly on wavelength, frequency, temperature, atmospheric pressure, gas mixture, and moisture content of the atmosphere prevailing in each case.

In virtually all devices for electronic distance measurement (EDM devices), the effect of the atmospheric parameters is added as a distance correction in a further computational step after completion of the actual distance measurement. The critical atmospheric parameters are measured in each case not with the distance-measuring instrument but with other, separate instruments, such as thermometer, barometer and hygrometer.

The distance $D_0$ (raw measurement) directly measured and displayed on the electronic distance-measuring instrument (EDM) relates to a specific group refractive index n. On the basis of the additionally measured meteorological parameters comprising temperature T, atmospheric pressure p and relative humidity RH, the true group refractive index n=n(T,p,RH, ...) can be calculated. By means of a so-called atmospheric correction $$\Delta D = D_0 \cdot \left(\frac{n_0 - n}{n}\right)$$

the true distance D can be determined:

$$D = D_0 + \Delta D$$

By means of this atmospheric "post-processing" method, as a rule accuracies of distance measurement in a region of 1 ppm are achieved. On the other hand, if temperature T and atmospheric pressure p are not known or are not representative over the entire optical path, the measured raw distance $D_0$ can easily deviate by 30 ppm or more from the true value.

In the case of longer distances, which moreover generally pass over irregular topography, a reliable determination of the effective group refractive index from meteorological data is problematic at the end points of the distances. Attempts to determine these data along the target beam have not been successful to date.

One of the basic concepts is the utilization of the spectral broad-band dispersion by measuring the distance with light or electromagnetic radiation of two different wavelengths. The 2- or multi-color method of measurement has been known since about 1975. In the case of simultaneous distance measurement using at least 2 different electromagnetic wavelengths, in the optical or microwave range, atmospheric disturbance parameters can be approximately determined by means of the spectral broad-band dispersive behavior of the atmosphere.

Corresponding theories are based on the spectral broad-band formulae of Edlen and Barrel & Sears. (Ref. Rainer Joeckel, Manfred Stober: Elektronische Entfernungs- und Richtungsmessung [Electronic distance and direction measurement], Verlag Konrad Wittwer.)

The results of the distance measurement of the 2 carrier wavelengths are $D_r$ and $D_b$, and the corresponding refractive indices are $n_r$ and $n_b$. The true distance is obtained by the following formula for the distance correction:

$$D = D_r - (D_b - D_r) \cdot \left(\frac{n_r - 1}{n_b - n_r}\right)$$

The actual problem of the 2-color method based on the model of the spectral broad-band formula consists in the accuracy of resolution with which the difference between the distances $(D_b - D_r)$ has to be determined. The further apart the two carrier wavelengths are, the smaller and more advantageous is the model parameter $$Q = \left(\frac{n_r - 1}{(n_b - n_r)}\right)$$

Since the accuracy of resolution is independent of the distance, these types of two-color instruments are potentially superior to the one-color measurement only in the case of relatively long distances substantially above 2 km.

Known 2-color instruments are, for example, Goran I from the National Physical Laboratory (Teddington, UK) with $\lambda_b$=458 nm and $\lambda_g$=514 nm, and the large Q=57. For a distance error of 1 mm, the required accuracy of resolution is 0.02 mm. Since the latter can be realized only with very great inconvenience, if at all, this method has not become established to date.

U.S. Pat. No. 5,233,176 discusses a device using the 2-color method, which compensates the atmospheric effects on measurement by evaluating the deviation of two laser beams of different wavelengths from a respective reference beam path. Here, the laser light is emitted at two different carrier wavelengths in short pulses. The dispersive effect is deduced from the dispersive shift of the two beam paths from the straight line, and the measurement is corrected.

A considerable disadvantage of all devices to date which use 2 or 3 carrier wavelengths is the utilization of the slightly variable broad-band optical dispersion. The procedure is often based on the broad-band models of Barrel & Sears or on the formulae according to Edlen. Furthermore, only broad-band methods have been used to date in the microwave range. The main disadvantage of traditional broadband techniques is that the distance correction obtained is often below the quality of the classical atmospheric correction based on the determination of the meteorological parameters T, p, and RH.

SUMMARY OF THE INVENTION

Several exemplarily embodiments of the present invention provide methods and devices for measuring the dispersion along a line of sight, using spectral narrow-band, and atmospheric structures, both in the absorptive (imaginary refractive index) and in the dispersive region (real refractive index).

Various embodiments of the invention can be achieved by one of ordinary skill in the art by the following detailed description.

BRIEF DESCRIPTION OF THE DRAWINGS

The features of embodiments of the present invention will become more apparent from the detailed description and accompanying drawings, wherein.

DETAILED DESCRIPTION OF EXEMPLARY EMBODIMENTS OF THE INVENTION

Figure 1:
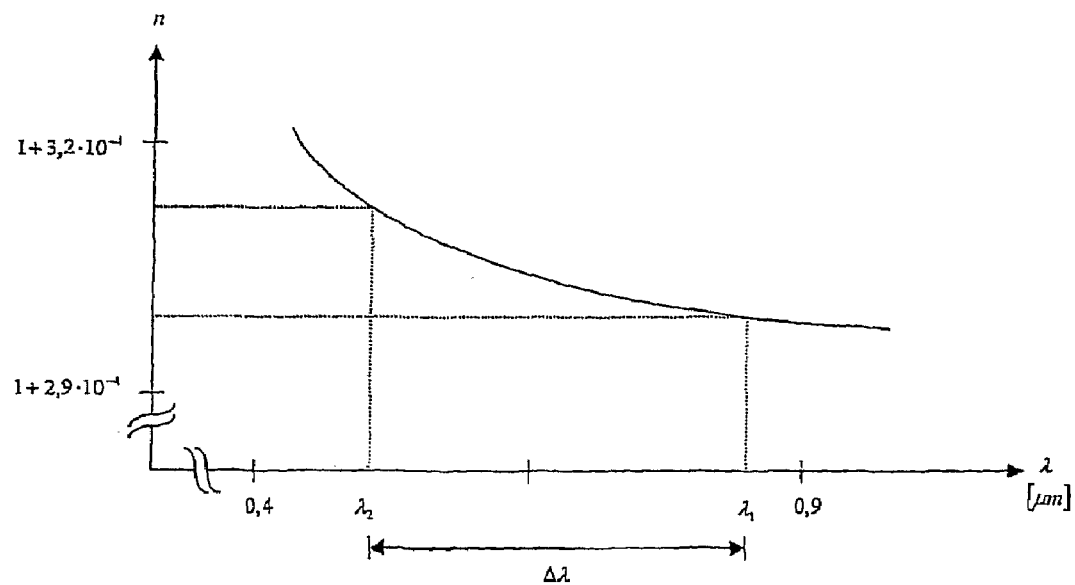
FIG. 1 shows a use of the normal dispersion for a 2-color method of the background art.

The following description of the exemplary embodiment(s) is merely exemplary in nature and is in no way intended to limit the invention, its application, or uses.

In exemplary embodiments of the present invention it has been found that the atmospheric transmission and hence also the refractive index at certain wavelengths have spectral structures which deviate in their behavior from the Edlen formula. Therefore, there are regions where the Edlen formula is not applicable and the effects are more pronounced than was known to date.

The meteorological, atmospheric, parameter in the formula of Barrel & Sears which is dominant for the 2-color absorption method is the particle density of the air molecules, with the validity of the ideal gas law assumed. Therefore there is an unknown, which can be determined by an additional measurement (the second carrier wave).

The integrated particle density of one type of molecule can be measured with a laser by means of a transmission measurement. The measured molecule can belong to the so-called uniformly mixed gases in order to be representative for the total atmospheric composition. Examples of uniformly mixed gases are $CO_2$, $O_2$, $NO_2$, $O_3$, $CH_4$, NO and $NH_3$. In addition, the molecule can have spectral textures in the wavelength range of commercial, economical semiconductor lasers and detectors. Furthermore, the optical effect can be reasonably measurable so that only gases having high partial pressure or strong absorption are suitable.

In exemplary embodiments of the present invention Oxygen $O_2$ can be considered to be particularly suitable. At particular concentrations, for example 20.95%, $O_2$ has strong absorption bands at the long-wave end of the visible spectral range between 759 nm and 778 nm. Commercially available laser diodes and sensitive semiconductor detectors are available for this range, so that economical solutions can be realized.

The EDM received signal can be measured at two wavelengths (2 colors), e.g. 785 nm and 760 nm. In order to be able to correct the distance measurement to 1 ppm, the relative signal would have to be measured accurately to 0.1%. For a distance correction accurate to 10 ppm, an EDM signal measurement accurate to 1% is required.

Accuracy limits for measurements of optical signals are typically 1%, the main factor influencing deviations of the signal measurement being atmospheric turbulence. In exemplary embodiments of the present invention a distance measurement can be measured [sic] accurately at least to 10 ppm.

More accurate distance corrections are achievable, for example because of the high resolution of the transit time, by utilizing the dispersive effects in the region of an absorption line.

Structures in the spectroscopically active bands, e.g. oxygen bands, can be optimally utilized using a spectrally narrow-band single-mode diode laser. The laser can be tuned to a region with an excessively high refractive index, with the result that the dispersion effect is more pronounced. Thus, the distance correction has a higher resolution.

Suitable spectral ranges with up to −390 ppm deviation from the Edlen formula are blocked by strong absorption lines, the strongest group refractive index deviation having sufficiently high transmission at +48 ppm. Used with a measurement $d_{meas,ir}$ in the infrared range, a measurement $d_{meas,red}$ in the red range, the distance correction becomes:

$$d_{true} = d_{meas,ir} - Q \cdot (d_{meas,ir} - d_{meas,\ red}) \text{ where } Q=6.2.$$

In exemplary embodiments of the present invention the correction can be three times better than in the case of the classical 2-color method according to Edlen or Barrel & Sears.

In exemplary embodiments of the present invention the laser wavelength can be stabilized to an optical line of a particular atom or molecule, e.g. the $O_2$ line.

In additional exemplary embodiments of the present invention the 2-color dispersion method can use a multimode laser diode. The 2-color method employs narrow-band lasers which act on a broad-band dispersion region of the atmosphere; in this embodiment, a broad-band light source acts on an absorption region of the air mixture which has a narrow-band structure.

In the region around 760 nm, oxygen has two strong absorption bands, one between 759.58 nm and 761.8246 nm and the other at 762.1802 nm and 778.37 nm. The first band has 115 lines, with 28 strong lines $$\left(\text{integrated intensity} > \frac{10^{-25} \text{ cm}^2 \cdot \text{cm}^{-1}}{\text{Molecule}}\right)$$

and the longer-wave one has 171 lines with 27 strong lines. The lines in the first band almost touch one another in the middle and are thus to a considerable extent cumulative in their optical effects on the dispersion effect.

In exemplary embodiments of the present invention the spectrally averaged and superposed group refractive index within the absorption band is on average, e.g. for oxygen 13 ppm, higher than the value next to the absorption band, used in the classical Edlen model. The result for the novel distance correction is:

$$d_{true}=d_{meas,ir}-Q\cdot(d_{meas,ir}-d_{meas,red}) \text{ where } Q=23.$$

In this embodiment, the correction is at least as good as in the classical 2-color method according to Edlen, however without the use of short-wave lasers. Short-wave lasers are generally bulky and expensive and have a high energy consumption which are [sic] unusable for battery-operated field instruments, such as tachymeters. Short-wave laser diodes have to date had an insufficient life and reliability.

The data given can be viewed in the context of the typical atmospheric scaling errors, which may be up to or even more than 30 ppm in the case of oblique measurements, over irregular topography or in the case of large temperature differences.

A distance measurement is associated with an absolute error of ±0.3 mm even in the case of short distances. The quantity ($d_{meas,ir}-d_{meas,red}$) thus has at least a statistical error of about 0.5 mm. The error in the case of the 2-color distance correction $Q\cdot(d_{meas,ir}-d_{meas,red})$ is therefore $Q\cdot(0.5 \text{ mm})$.

In additional exemplary embodiments according to the present invention, wavelength stabilization is not needed. A transmitter lying in the absorption band, e.g. of oxygen, can be replaced by a narrow-band LED or by an LED in combination with a narrow-band filter, for example an interference filter. Thus, the anomalous dispersion effect can also be measured, it being possible to completely dispense with the wavelength stabilization.

Economical laser diodes having small size are used as a light sources in the present-day geodetic distance-measuring instruments. An economical laser diode or LED can be used for the second light source, in particular one of the same compactness, small size and actuation behavior as the first light source of the distance-measuring instrument according to methods and devices of embodiments of the present invention. Improvements of the 2-color method are therefore possible since the transmitted beam path and the electronic actuation are duplicated.

According to exemplary embodiments of the present invention, the optical carrier wavelength of the two laser diodes can be chosen to be close together. If the distance is determined, for example, to be 5 nm to 10 nm, a common, simple optical bandpass filter is sufficient for background blocking.

In an exemplary embodiment of the present invention both wavelengths can be detected using one receiving diode, e.g. an avalanche photodiode (APD), owing to the spectral closeness of the two carrier wavelengths.

In the case of the conventional 2-color methods, the optical carrier wavelengths are separated from one another by as much as possible in order to amplify the dispersion effect. However, often the receiving diodes do not cover the large optical spectral range.

In the realizations of the conventional 2-color method, one of the two carrier wavelengths is as a rule in the blue spectral range. In comparison with the 800 nm range, however, there are neither sensitive nor economical avalanche photodiodes in that range.

A further disadvantage of using the conventional broadband method with blue light is the atmospheric dispersion power. The dispersion coefficient of air increases to the power of 4 as the wavelength becomes shorter. This effect is caused by the Rayleigh dispersion mechanism. In the method of the background art, the signal power loss in the case of the short-wave radiation is about 16 times greater than in the method according to exemplary embodiments of the present invention with wavelengths of about 800 nm, the blue wavelength of 400 nm is 2 times shorter than in the method according to exemplary embodiments of the present invention, and the factor is explained by the dependence of the Rayleigh dispersion as a function of 10 to the power of 4.

In exemplary embodiments of the present invention the total optical receiving channel can be used for both colors together without particular efforts. The otherwise dominant chromatic optical image aberrations are not present. In the conventional 2-color method with carrier wavelengths lying far apart, complicated optical correction lenses have to be used in devices of the background art.

FIG. 1 shows a use of the normal dispersion for a 2-color method of the background art by using two carrier wavelengths $\lambda_1$ and $\lambda_2$, which probe an atmospheric gas in the visible spectral range and in ranges of normal dispersion. The wavelength $\lambda$ is plotted along the horizontal axis, and the refractive index n along the vertical axis. Since the precision of the dispersion correction requires as large a difference as possible between the measured refractive indices, it is necessary, owing to the dependence of the refractive index on the wavelength, to choose two carrier wavelengths which are far apart, i.e. the difference $\Delta\lambda$ of the carrier wavelengths $\lambda_1$ and $\lambda_2$ is increased.

Figure 2:
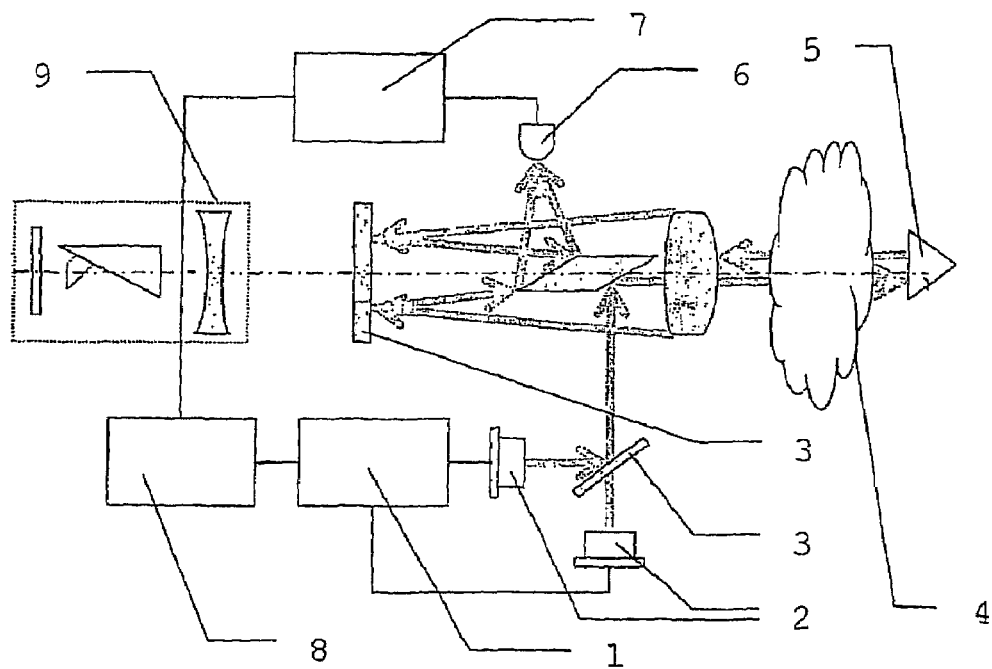
FIG. 2 shows a schematic diagram of a device using an exemplary embodiment of the invention in a theodolite telescope.

FIG. 2 schematically shows the use of an exemplary embodiment of the present invention in a theodolite telescope. Radiation sources 2, which emit electromagnetic radiation of different carrier wavelengths are actuated by a transmitting unit 1. The two carrier wavelengths are combined via a beam splitter 3a and are passed through the atmospheric gas 4, to be probed, onto a reflector 5. After reflection, the radiation is picked up by a receiver 6, via reflections off of reflector 3b, and electronically processed in a receiving unit 7. In a down-circuit distance-measuring unit 8, the distance to be measured is calculated and is corrected for the dispersive effect. Optionally, a visual telescope 9 can be used for aligning the theodolite.

Figure 3:
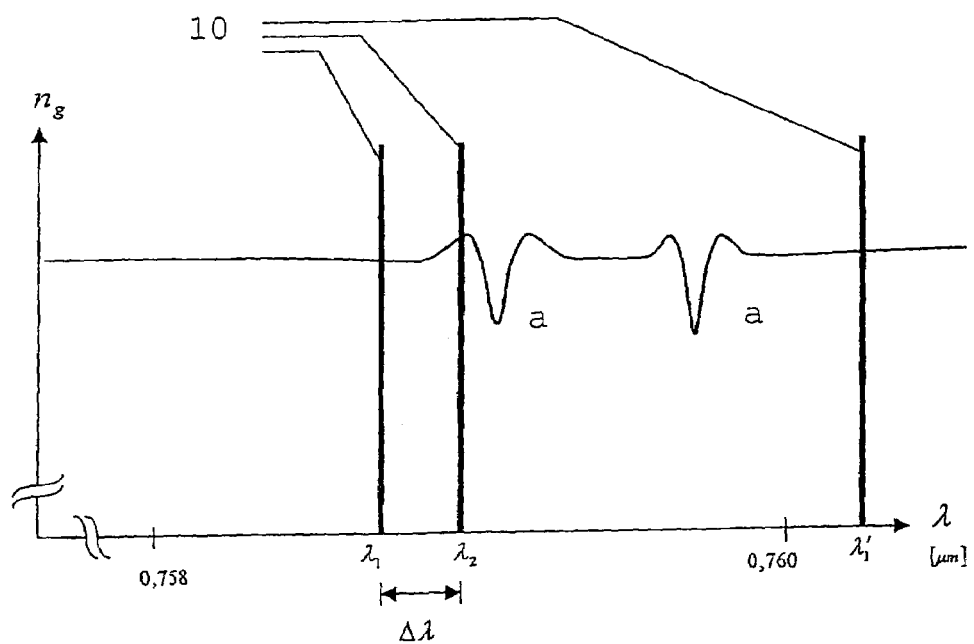
FIG. 3 shows a utilization of the narrow-band dispersion with single-mode lasers in an exemplary embodiment of the present invention.

FIG. 3 shows a diagram of the method according to an exemplary embodiment of the present invention, utilizing the narrow-band dispersion with single-mode lasers. The wavelength $\lambda$ is plotted along the horizontal axis, and the group refractive index n (labelled as $n_g$ along the vertical axis). The refractive index curve shows two resonances a of the atmospheric gas to be probed, which in this example is oxygen $O_2$. The method uses two laser modes 10 with carrier wavelengths $\lambda_1$, $\lambda'_1$, and $\lambda_2$ which are different but are located comparatively close together with respect to the background art. A region of normal dispersion is probed with the carrier wavelength $\lambda_1$ or $\lambda'_1$, it being possible for the carrier wavelength $\lambda_1$, $\lambda'_1$ to be present on the shorter- or longer-wave side of the resonances "a." In the case of a sufficiently large distance, it is also possible to meet a region of normal dispersion between the resonances "a." The carrier wavelength $\lambda_2$ meets a region having an excessively high refractive index in the immediate vicinity of the actual resonance "a." By utilizing this excessively high refractive index, a sufficiently large difference between refractive indices can also be achieved with carrier wavelengths $\lambda_1$, $\lambda'_1$, and $\lambda_2$ located close together.

Figure 4:
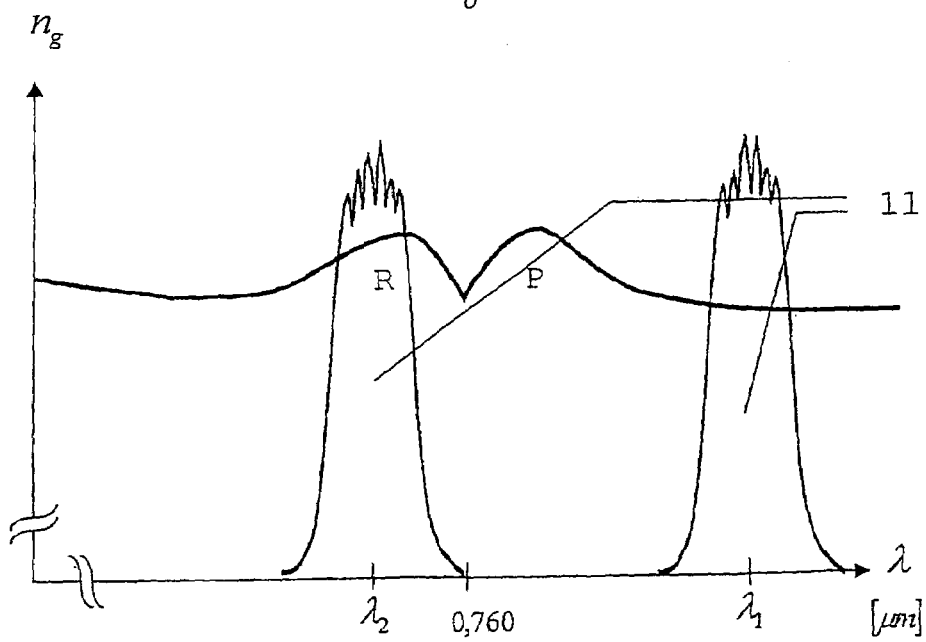
FIG. 4 shows a utilization of the narrow-band dispersion with multimode lasers in an exemplary embodiment of the present invention.

An additional exemplary embodiment according to the present invention is shown in FIG. 4. The wavelength $\lambda$ is plotted along the horizontal axis, and the group refractive index n (labelled as $n_g$ along the vertical axis). With two multimode lasers 11, regions of normal dispersion and regions with rotation-vibration bands are encountered. The narrow-band laser modes around the carrier wavelength $\lambda_2$ probe the R-branch (R) of the rotation-vibration bands of a gas, e.g. oxygen $O_2$. The other multimode laser 11 emits modes around another carrier wavelength $\lambda_1$, which in this case is, for example, in the longer-wave range of the spectrum.

Figure 5:
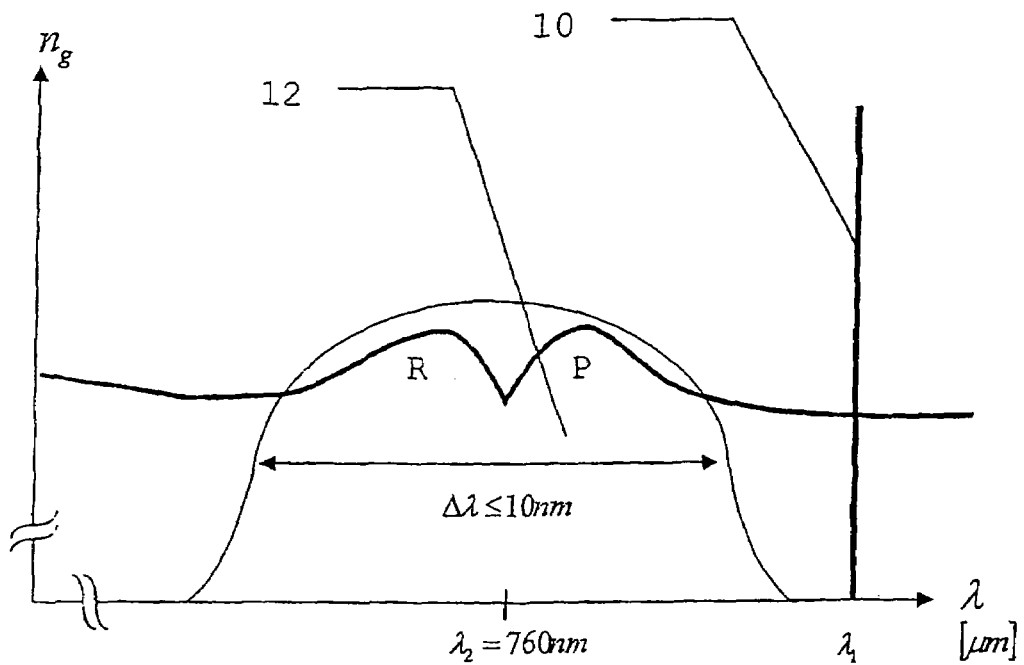
FIG. 5 shows a utilization of the narrow-band dispersion with light emitting diodes (LED) in an exemplary embodiment of the present invention.

FIG. 5 illustrates another exemplary embodiment of the present invention, in which the narrow-band radiation of a light emitting diode (LED) 12, which is around the carrier wavelength $\lambda_2$, overlaps the range of the R-branch R and of the P-branch P of the rotation-vibration bands of a gas, e.g. oxygen $O_2$, and thus determines it. A region of normal dispersion is covered by a second carrier wavelength $\lambda_1$, which can be realized, for example, as a single-mode laser 10. In the evaluation, the different contributions of the various wavelength-dependent refractive indices of the determined region of the R- and P-branches, R and P respectively, should be taken into account. By utilizing this region with components of excessively high refractive indices, a sufficiently large difference between the refractive indices can be achieved even with an LED and a multimode or single-mode laser.

Figure 6:
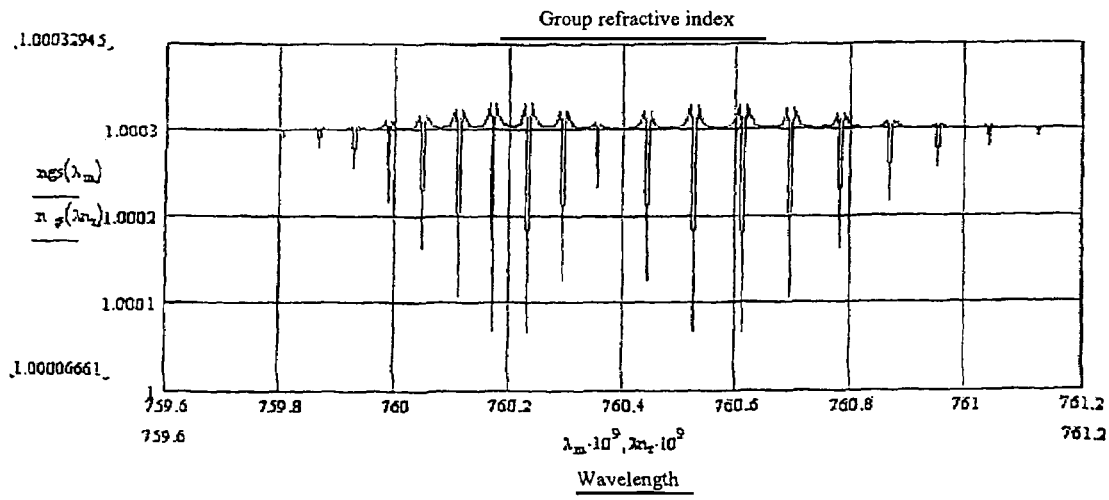
FIG. 6 shows the fine structure curve of the group refractive index in an exemplary embodiment of the present invention.

FIG. 6 shows, by way of example, a fine-structured, narrow-band, curve of the group refractive index in the absorption band of an atmospheric gas. The curve illustrates an example of gases having a portion of the structure shown in FIG. 5.

Of course, the figures shown represent one of many embodiments, and a person skilled in the art can derive alternative forms of realization, for example with the use of other atmospheric gases or other means for emission and for reception of electromagnetic radiation or for signal pick-up or signal processing.

While the exemplary embodiments of the present invention have been particularly shown and described, it will be understood by those of ordinary skill in the art that various changes in form and details may be made therein without departing from the spirit and scope of the present invention as defined by the following claims.

I claim:

1. A method for determining the dispersive effect on a measurement along a line comprising:
    emitting electromagnetic radiation having at least two carrier wavelengths, where a first carrier wavelength is selected in a wavelength range without molecular or atomic absorption of atmospheric gases and a second carrier wavelength is selected in a wavelength range with molecular or atomic absorption;
    receiving electromagnetic radiation of the at least two carrier wavelengths;
    measuring at least two measured transit times corresponding to the transit times of electromagnetic radiation of the at least two different carrier wavelengths along the line; and
    calculating the dispersive effect from the at least two measured transit times of the electromagnetic radiation.

2. The method as claimed in claim 1, wherein at least one of the two carrier wavelengths is emitted in the wavelength range of the atmospheric transmission window for visible light or in the infrared range.

3. The method according to claim 1, wherein the second carrier wavelength is within the molecular or atomic absorption range of the oxygen molecule.

4. The method according to claim 1, wherein the radiation associated with the second carrier wavelength is spectrally monomodal radiation.

5. The method according to claim 1, wherein the means for emission emits a third carrier wavelength and the means for transit time determination calculates an absorption band of atmospheric water vapor using the third carrier wavelength and calculates the dispersive effect of the water vapor.

6. A method of correcting a distance value from a distance measurement device comprising:
    receiving radiation, wherein the radiation has at least two components having a first and a second wavelength, and the second wavelength has a value in a radiation absorption range of a medium, and where the first and second wavelengths lie in a narrow-band range;
    calculating a first transit time associated with the radiation component having the first wavelength;
    calculating a second transit time associated with the radiation component having the second wavelength;
    calculating the dispersion effect of the medium on the received electromagnetic radiation using the first and second transit times; and
    correcting the distance value using the calculated dispersion effect.

7. A device for determining the dispersive effect on a measurement along a line comprising:
    means for emission, wherein the means for emission emits electromagnetic radiation having at least two carrier wavelengths, where a first carrier wavelength is selected in a wavelength range without molecular or atomic absorption of atmospheric gases and a second carrier wavelength is selected in a wavelength range with molecular or atomic absorption;
    means for receiving, wherein the means for receiving receives electromagnetic radiation of the at least two carrier wavelengths;
    means for measuring, wherein the means for measuring measures at least two measured transit times corresponding to the transit times of electromagnetic radiation of the at least two different carrier wavelengths along the line; and
    means for calculation, wherein the means for calculation calculates the dispersive effect from the at least two measured transit times of the electromagnetic radiation.

8. The device as claimed in claim 7, further comprising:
    means for correction, wherein the means for correction calculates the dispersive effect and corrects a distance measurement.

9. The device as claimed in claim 7, wherein the means for emission emit at least one of the two carrier wavelengths in the wavelength range of the atmospheric transmission window for visible light.

10. The device as claimed in claim 7, wherein the means for emission emits radiation associated with the second carrier wavelength In a wavelength range with molecular or atomic absorption of the oxygen molecule O2.

11. The device as claimed in claim 7, wherein the means for emission, emits a second carrier wavelength in the range from 685 nm to 690 nm or 755 nm to 780 nm.

12. The device as claimed in claim 7, wherein the means for emission comprises at least one of the following:
- a laser diode for the emission of spectrally monomodal radiation,
- a laser diode for the emission of spectrally multimodal radiation,
- a laser diode for the emission of radiation whose spectral width corresponds to the order of magnitude of the absorption band,
- an LED for the emission of radiation whose spectral width corresponds to the order of magnitude of the absorption band, or
- an LED-filter combination for the emission of radiation whose spectral width corresponds to the order of magnitude of the absorption band.

13. The device as claimed in claim 7, wherein at least one carrier wavelength of the electromagnetic radiation is shifted.

14. The device as claimed in claim 7, further comprising:
- stabilizing means, wherein the stabilizing means stabilizes the wavelength of at least one carrier wavelength, using at least one of:
- Distributed Feedback (DFB),
- Distributed Bragg Reflector (DBR), or
- Fabry-Perot-Etalon locking.

15. The device as claimed in claim 7, wherein the device or at least one of its components is modular.

16. The device as claimed in claim 7, wherein the means for emission emits a third carrier wavelength, the third carrier wavelength lies in an absorption band of atmospheric water vapor, and the dispersion effect of the water vapor is calculated using the third carrier wavelength.

17. A correction device for correcting a distance value from a distance measurement device comprising:
- a receiving radiation element, wherein the radiation element receives electromagnetic radiation that has at least two components having a first and a second wavelength, and the second wavelength has a value in a radiation absorption range of a medium, and where the first and second wavelengths lie in a narrow-band range; and
- a calculating element, wherein the calculating element calculates a first transit time associated with the radiation component having the first wavelength and a second transit time associated with the radiation component having the second wavelength, where the dispersion effect of the medium on the received electromagnetic radiation using the first and second transit times is calculated and,
- where the calculating element corrects the distance value using the calculated dispersion effect.

18. A theodolite using the correction device of claim 17.

19. A device for determining the dispersive effect on electromagnetic radiation comprising:
- means for reception, wherein the means for 20 reception receives electromagnetic radiation of a first and second wavelength in a narrow band wavelength range;
- means for transit time determination, wherein the means for transit time determination measures a first transit time associated with the first wavelength and a second transit time associated with the second wavelength; and
- means for dispersive calculation, wherein the means for dispersive calculation uses the first and second transit times to calculate a pre-reception dispersive effect experienced by the electromagnetic radiation.

20. The device according to claim 19, wherein the second wavelength lies in a the range of radiation absorption of a medium causing the pre-reception dispersion effect.

21. The method according to claim 1, wherein the radiation associated with the second carrier wavelength is spectrally multimodal radiation.

22. The method of claim 21, wherein the multimodal radiation is obtained by shifting the wavelength over the range of the absorption band.

23. The method according to claim 1, wherein the radiation associated with the second carrier wavelength whose spectral width corresponds to the order of magnitude of the absorption band.

24. The method according to claim 1, further comprising:
- storing the dispersive effect at least temporarily in a distance-measuring unit.

25. The method according to claim 6, further comprising:
- storing the distance value at least temporarily in a distance-measuring unit.

* * * * *